2. Sheets.
Sheet. 1.

J. Lemman.
Hoisting App.

Figure 1:
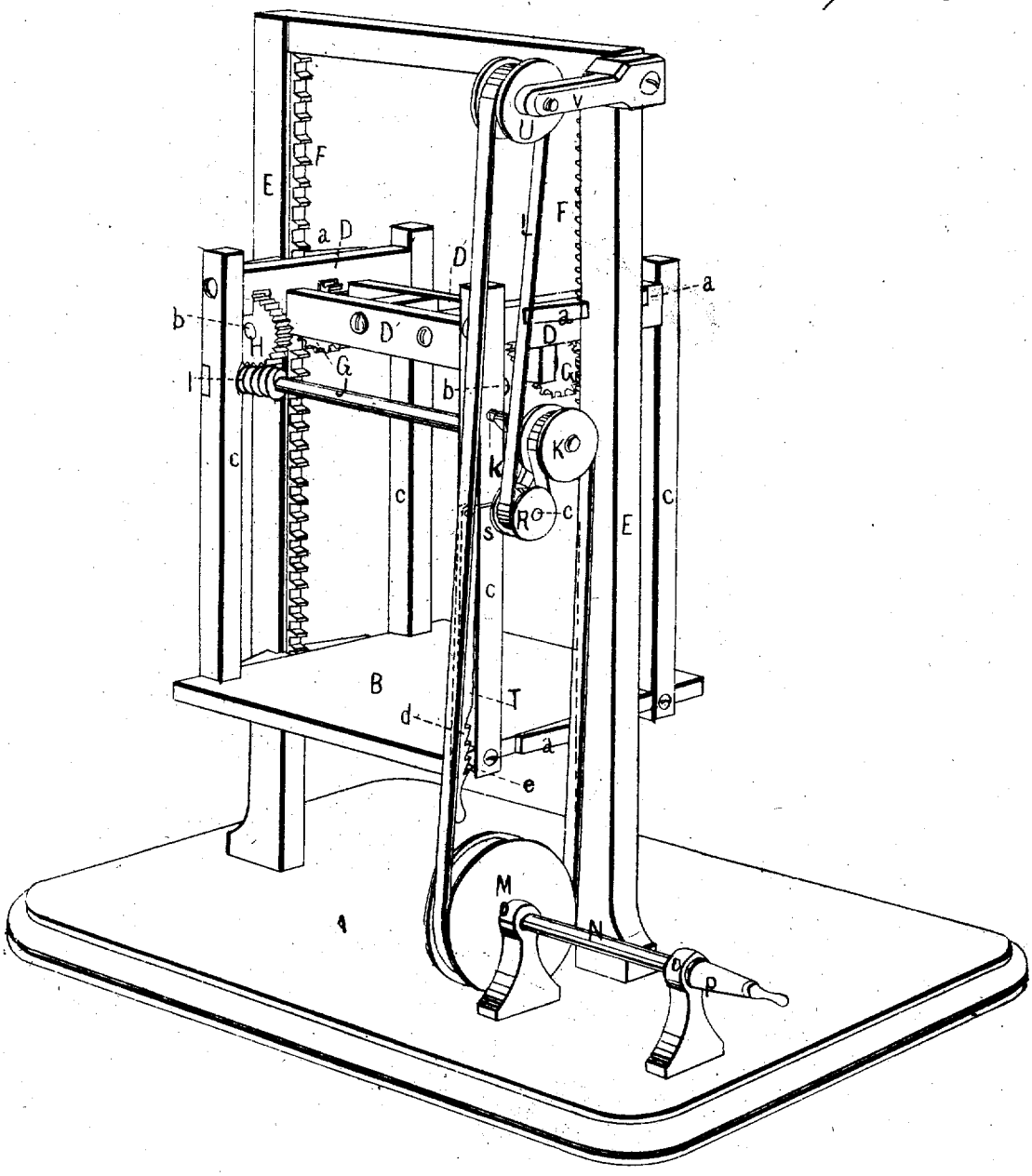

No 2325 Fig. 1. Reissued July 31 1866

Witnesses:
Wm Clough
Charles L Fisher

Inventor:
John Lemman

2. Sheets
Sheet. 2

J. Lemman.
Hoisting App.

No. 2325

Reissued July 31, 1866

Witnesses:

Wm Clough

Charles L. Fisher

Inventor:

John Lemman

UNITED STATES PATENT OFFICE.

JOHN LEMMAN, OF CINCINNATI, OHIO.

IMPROVEMENT IN HOISTING APPARATUS.

Specification forming part of Letters Patent No. 29,180, dated July 17, 1860; Reissue No. 2,325, dated July 31, 1866.

*To all whom it may concern:*

Be it known that I, J. LEMMAN, of Cincinnati, in the county of Hamilton and State of Ohio, have invented a new and useful Improvement in Hoisting Machines or Apparatus; and I do hereby declare that the following is a full and complete description thereof, reference being had to the accompanying drawings and letters of reference marked thereon, making a part hereof.

Figure 2:
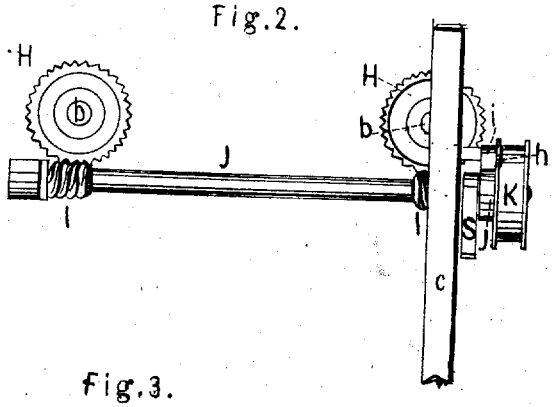
Figure 3:
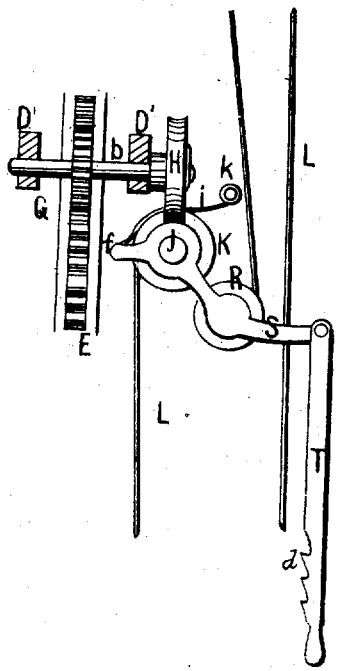

Figure 1 is an elevation of an apparatus made according to my invention. Figs. 2 and 3 are detailed views of separate parts of the apparatus.

This invention relates to hoisting and lowering merchandise and other articles in vessels, warehouses, and other places.

It consists, in general terms, in causing a traveling platform to move up and down, at the pleasure of the operator, along fixed vertical guides, which reach from the ground to the highest floor of the warehouse in which it is to be used. If the apparatus is used in a vessel, the guides will extend from the hold to the upper deck, or as far above it as is necessary to enable the platform to be loaded and unloaded therefrom. It is adapted to the ordinary hatchways of vessels and of warehouses, and is constructed with reference to affording the means of raising and lowering merchandise or heavy bodies with ease and dispatch, and with very much more security against the painful accidents which so frequently attend the operation of hoisting and lowering by the ordinary means.

To enable others of competent skill to make and use my invention, I will proceed to describe its construction and operation.

A designates a lower floor or platform, on which the hoisting apparatus is erected. It may designate the lower floor of a building or the bottom or the lower deck of a vessel.

B is a platform, upon which merchandise or heavy bodies to be raised or lowered from one floor or level to another are placed. It should have an area nearly as great as the hatchway or space through the floor or deck to which it is adapted. Framed or secured on opposite ends, and near the four corners of the platform, are four upright corner-pieces, C, and these are connected together at top by the framed pieces D D and D′ D′, the whole making a rectangular frame, of which the platform B is the bottom. The rectangular frame should be sufficiently high to accommodate the articles which are to be transported upon the platform without interfering with the working parts attached to the upper part of the frame.

E E are heavy rack-pieces, which guide the platform and its frame, and also furnish means for elevating it by reason of the cog-teeth formed on them. They are placed vertically, one upon either of two opposite sides of the space or hatchway through which the platform and frame are to be moved, being firmly secured to the frame-work of the building or vessel, and they extend from the lower floor to a point far enough above the upper floor to which the platform is to be elevated to accommodate the working parts attached to the upper part of the rectangular frame, which working parts are hereinafter described. Upon the inner faces of these rack-pieces are secured the heavy metal racks F, extending their entire length. The space across the hatchway and the continuous vertical space between the two racks —that is to say, from the face of one rack across to the face of the other rack, from the lower floor to the upper floor—is occupied and traversed by the rectangular frame and platform B. The frame is guided in its traverse up and down by brackets *a*, fastened to the outer faces of frame-pieces D D, and to the corresponding outer edges of platform B, these brackets forming a recess which is occupied by the rack-pieces E, thus causing the platform B to rise and fall in a vertical line.

The platform B and rectangular frame are caused to rise and fall by the action of gear-wheels G, which work in the racks F. These wheels are hung upon shafts *b*, (see Fig. 3,) which, passing through frame-pieces D′ D′, support the frame and platform. Upon the same shafts *b*, respectively, are the worm-wheels H H, and these are acted upon by the worms I I upon shaft J. One of said worms has a right-hand direction and the other a left-hand. The shaft J is rotated by a belt, L, acting upon a pulley, K, placed at the outer extremity of said shaft J.

Working in appropriate boxes in standards O O, which are well secured to floor A, is the shaft N, carrying a pulley, M. This shaft and pulley are rotated by crank P, or, in case it should be required to work the apparatus by a steam-engine or other motive power, a pulley may be placed upon shaft N, by which motion may be communicated to the parts through the belt L and the system of gearing herein described. The belt L, after passing under pulley M, is continued upward to a pulley, U, supported by an arm which projects from the upper end of one of the rack-pieces E. After passing around pulley U the belt is carried downward and around a pulley, R, thence upward and around the before-mentioned pulley K, and thence downward to the pulley M, at the place of beginning. The pulley R revolves upon a wrist or pin, which is secured to the movable bar S. (See Fig. 3.) This bar is hung to shaft J, and has a short extension beyond the shaft J, which will be referred to hereinafter. To the outer extremity of the longer arm of bar S is jointed the notched piece T, its notches *d* being adapted to a stationary pin, *e*, projecting from the edge of platform B. The bar S carries a pin behind the point in the short arm of the bar, (marked *f*,) and to this pin is fastened a metallic friction-band, *i*, which is carried over an annular flange formed either on the shaft J or else upon the adjacent side of pulley K, as in this example, and, extending beyond the same, is secured to a pin, *k*, on one of the upright frame-pieces C. This band acts as a brake upon the shaft J, and may be put in operation when the pulley R is raised, at which times the belt L is slack and ceases to act on the shaft J.

The arrangement of the belt L upon the pulleys M K U, in combination with the pulley R upon the long arm S, is such that when the bar S is elevated, carrying up the pulley R, the belt L becomes slack and ceases to turn the pulley K by means of frictional contact. The pulley M being at the bottom of the series, and the belt L when slackened by the elevation of pulley R falling by its own gravity away from the said pulley M, it is permitted to revolve without imparting any motion to the belt L, and consequently without producing any effect upon the gearing by which the frame and platform are raised or lowered. If, on the other hand, the bar S is depressed the slack of belt L is taken up by the pulley, and the action of the driving-pulley is transferred to the running-gearing, by means of which the platform B is raised or lowered. The belt L can be kept in frictional contact with the several pulleys of the apparatus by holding the bar S stationary, which is effected by bringing the notches *d* in the bar T into range with and causing one of them to engage the stationary pin *e*.

It will be observed that when the long arm of the bar S and the pulley R are elevated, thereby slacking the belt and arresting the communication of motion to the gearing and platform, the short arm of the lever S is at the same time depressed, and the friction-band *i*, which partly encircles the annular flange upon the pulley K, is brought into contact with the above-named annular flange, and the motion of the platform downward with whatever load may be upon it is arrested by means of the friction of the band upon the flange.

When it is desired to put the apparatus in operation for the purpose of elevating and then lowering any burden which may be upon the platform, the shaft N, carrying the pulley M, being first put in motion, the bar S is next depressed so as to bring down the pulley R, and thus take up the slack of the belt, when the belt will receive motion from the pulley M and communicate it to pulley K and shaft J. The right and left hand worms I I give motion to the gear-wheels G G in opposite directions through the intermediary worm-wheels H H, and thereby cause the platform carrying the burden to be elevated regularly and securely at a rate proportioned to the revolutions of shaft N. If it is now desired to suspend the operation of raising the platform and burden at any point, the operator, with his hand upon the notched bar T, relieves the belt L and allows it partly to adhere and partly to slip upon the pulley M, thus reducing the motion of the platform to any required speed, and ultimately, by wholly releasing the belt L from close contact with pulley M, stops the ascent of platform and burden at the precise point desired. The weight of the platform and burden will not usually be sufficient to cause the gearing to lower without the attention of the operator; but if the burden is required to be lowered from one level or floor to another the motion of the shaft N, which carries the pulley M, will require to be reversed, when the reverse motion of the parts which have been described as raising the platform will lower the same, the bar S controlling the tension of belt L and affording the means of arresting the descent at any desired point, except that in case of lowering burdens at considerable speed the bar S may sometimes require to be not only elevated sufficiently to render the belt L entirely slack, but it may be required to carry it up far enough to bring down the friction-band *i*, which is controlled by the short arm of lever S acting upon the annular flange above described, and thus arrest the rapid descent of the platform and burden by friction.

Should any part of the apparatus give way other than the rack or pinions, the platform and burden will remain stationary, or, if inclined to descend, would do so slowly and without danger to the other parts; but if the supporting arrangements—that is, either the rack or pinion upon one side—were to give way, the whole burden being thrown upon the other side, the rectangular frame, carrying the platform and burden, would be forced obliquely into the space between the two upright rack-pieces, and would in all probability lock itself and descend no farther. Should the danger from this source be regarded as of any moment, the apparatus could be furnished with a dog or detent upon either side adapted to the teeth of the respective racks, which would place the matter beyond any danger.

By placing the driving-shaft N and its pulley upon the platform B and securing them to the same in a position to permit the pulley M to range with the pulley K, and then belting direct from one to the other—that is to say, from the pulley M, as arranged upon the platform B, to the pulley K, as now arranged upon the end of the shaft J—an attendant standing upon the platform B and operating the crank P may raise or lower himself with a moderate burden from one floor to another, and thus in many instances avoid the employment of two workmen in the service thus accomplished by one.

Each end of the hoisting apparatus has independent gearing, the shaft *b* at one end, with its gear-wheels H G, being without any connection with the shaft *b* and gears at the other end; but yet both shafts are operated from the same shaft J.

When the platform B is heavily laden the pressure of the load will not cause the platform to descend with speed even if it causes any descent at all, because the worm-wheels H will not be able to impart much motion, if any, to the worms or screws I I. The latter will therefore have the effect of stopping and arresting any downward tendency of the platform without allowing any additional pressur or strain to come on the ends of shaft J.

The pulley R is used simply as an idle or deflecting pulley to carry out the peculiar manner above shown of belting the pulleys, which permits the transmission of power from a stationary shaft to a shaft on a moving platform.

Having thus described my invention, I claim as new and desire to secure by Letters Patent—

1. The system of gearing composed of gear-wheels G G, worm-wheels H H, worms I I, and racks F F, all arranged and operating substantially as and for the purpose described.

2. In hoisting-machines, the use of two worms on one shaft, the one right-hand and the other left, each gearing into an appropriate worm-wheel, and each furnishing a step for the other, substantially as shown and described.

3. In a power hoisting-machine, the attaching to and carrying the climbing machinery with the platform, the power for operating the same not being located on the platform, in the manner herein described.

JOHN LEMMAN.

Witnesses:

OLIVER BRITT,

J. H. KNICKERBOCKER.